C. Wheeler Jr.
Mower.
No 2610
Reissued May 14, 1867.
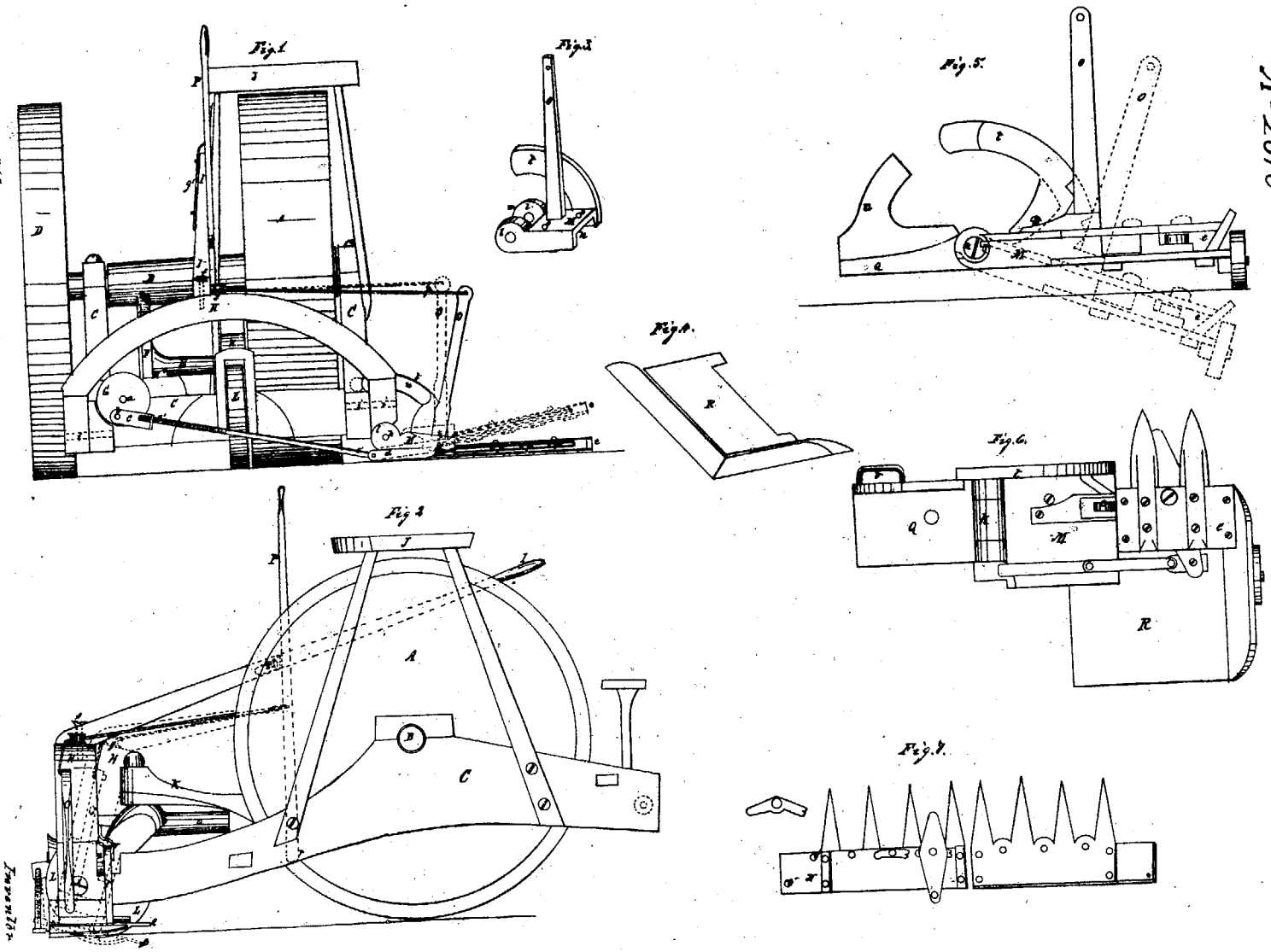
Witnesses
Geo. H. Bradley
C. E. Bradley
Inventor
per Munn & Co. Attys. C. Wheeler Jr.

UNITED STATES PATENT OFFICE.

CYRENUS WHEELER, JR., OF AUBURN, NEW YORK.

IMPROVEMENT IN HARVESTERS.

Specification forming part of Letters Patent No. 12,044, dated December 5, 1854; reissue No. 876, dated January 3, 1860; reissue No. 2,610, dated May 14, 1867.

*To all whom it may concern:*

Be it known that I, CYRENUS WHEELER, Jr., of Auburn, New York, have invented certain new and useful Improvements in Grain and Grass Harvesters; and I do hereby declare the following to be a full, clear, and exact description of the same, reference being had to the accompanying drawings, making a part hereof, in which—

Figure 1 represents a rear elevation of a harvesting-machine for grain or grass. Fig. 2 represents a side elevation of the same from the right-hand or grain side of the machine. Figs. 3 and 4 represent detached portions of the machine. Figs. 5 and 6 represent, on an enlarged scale, respectively, an elevation and plan of the finger-bar and its hinged connection, to allow it to accommodate itself to the surface of the ground, or to be raised up therefrom, as circumstances may require. Fig. 7 represents a cutting apparatus connected to the finger-bar.

Similar letters of reference where they occur in the several figures denote like parts of the machine in all of them.

To adapt a harvesting-machine to the mowing of grass it is necessary that the finger and cutter bar should travel close to the ground, and not only this, but that they should receive all their vertical movements from the ground over which they pass, and not be influenced by the projections or depressions over which the driving wheel or wheels are passing. But as the finger and cutter bar must receive their advancing movement from the main frame, its organization and connection of the cutter therewith must be such as to allow the finger-beam to have a free vertical movement both above and below the plane over which the driving-wheel is passing.

The object of this invention is to cause the finger-beam to conform to the undulations of the ground independently of the movement of the driving-wheels, and this is accomplished by employing a frame which vibrates about the axis of the driving-wheels, and attaching the finger-bar to one corner thereof, and attaching the draft to the frame by means of a loose or hinged connection. The gearing which drives the cutter is so arranged about the axis of the drive-wheels as a driving center that, as the corner of the frame, to which the finger-bar is attached, rises and falls, the driving of the cutter is not disturbed. The finger-bar is attached to this vibrating frame at one corner by means of a hinge. The propulsion of the finger-bar forward is effected solely by this hinge. Thus, while the vibrating frame permits the finger-bar attached to its corner to follow the ground, the hinge propels the finger-bar, and permits its outer end to rise on said hinge, and thus a floating finger-beam is produced. The gearing consists of a beveled wheel on a shaft extending from the inner side of a rim attached to the driving-wheel to the beveled wheel on one end of the crank-shaft, by which the cutter is vibrated, and thus the cutter vibrates without disturbing the relative position of these driving parts.

To enable others skilled in the art to make and apply my invention, I will proceed to describe the same in connection with the accompanying drawings.

A is a main supporting and driving wheel, turning with the axle B; and D is a carrying-wheel on the same axle, but loose thereon. The frame C is supported by these wheels and this axle in the usual manner. At or near one corner of the frame is secured a shoe, M, by a hinged joint, K, so that said shoe may freely swing up and down above and below the point to which it is hinged; and to this shoe the finger-bar is bolted by one of its ends, leaving the other end perfectly free to move over and on the ground, conforming to the undulations thereof without being influenced by the moving of the frame, except to advance the finger-bar. To this shoe M may be connected a cord or chain, *p*, which, passing around a suitable pulley, *g*, to bring it into a proper direction, is then fastened to a lever, P, near the driver's seat, so that the driver, from his seat, may at any time turn up the outer end of the finger-bar to carry it over any obstructions in its path. By taking up or letting out the cord or chain *p*, the extent to which the finger-bar may drop is accurately adjusted, while it is free to rise above that line to accommodate itself to the surface over which it is drawn.

I thus make what I term a floating finger-bar—that is, a finger-bar hinged by one of its ends to one corner of the vibrating frame, or so connected thereto through a hinge-joint as that, while it is advanced over the ground by the advancing movement of the vibrating frame, it will be free to rise or fall at its outer end to accommodate itself to the surface of the ground over which it passes; and at its inner end, rising and falling with the movement of the vibrating frame, is the caster-wheel L, allowing the corner of the frame and the end of the finger-bar hinged to it to run close to or on the ground in mowing.

Having thus fully described the nature and object of this part of my invention, what I claim, and desire to secure by Letters Patent, is—

In combination with a harvester-frame that is free to vibrate about a gear-center, a laterally-projecting finger-bar, so hinged to one end or corner of said frame as to permit the finger-bar at each end to follow the undulations of the ground over which it is drawn.

C. WHEELER, JR.

Witnesses:
WM. ALLEN,
GEO. E. BUCKLEY.